United States Patent Office 2,857,475
Patented Oct. 21, 1958

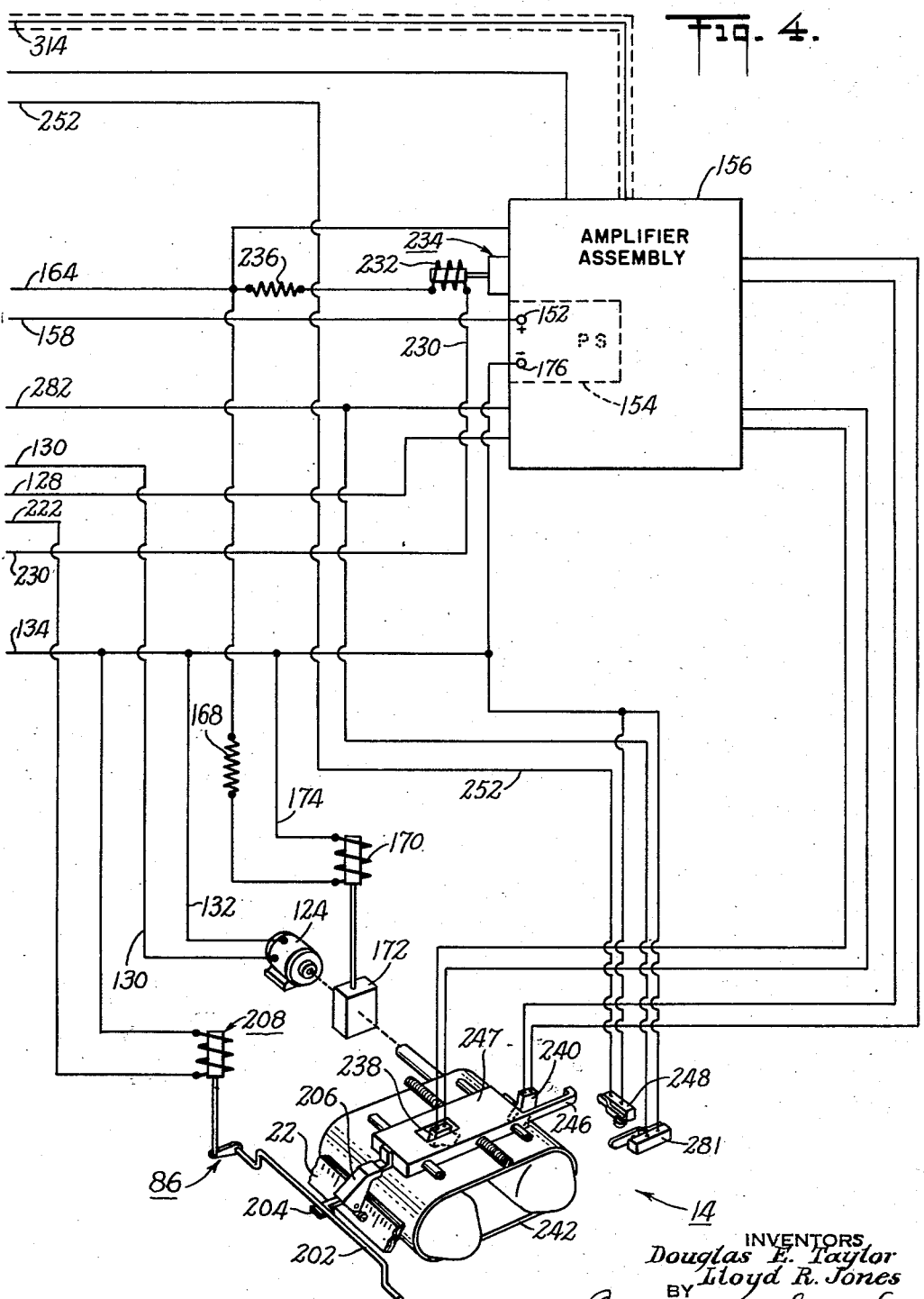

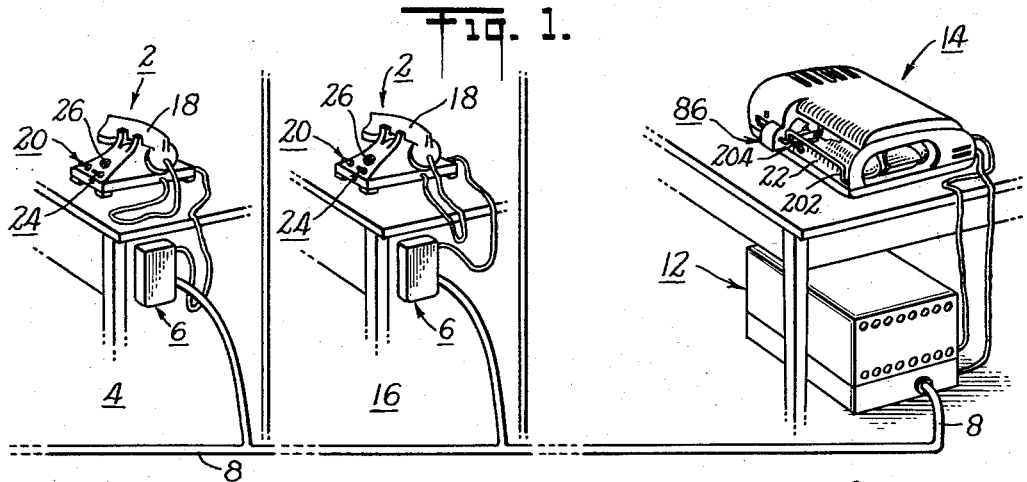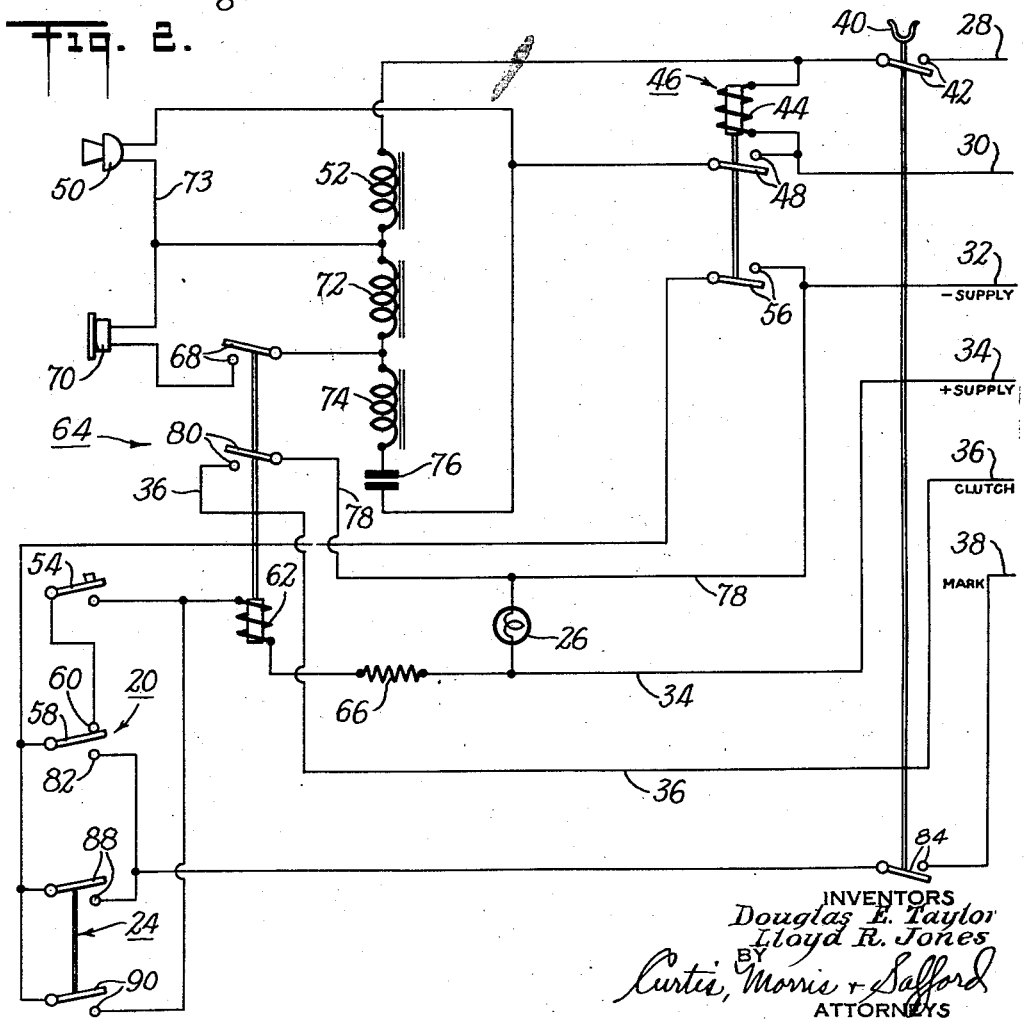

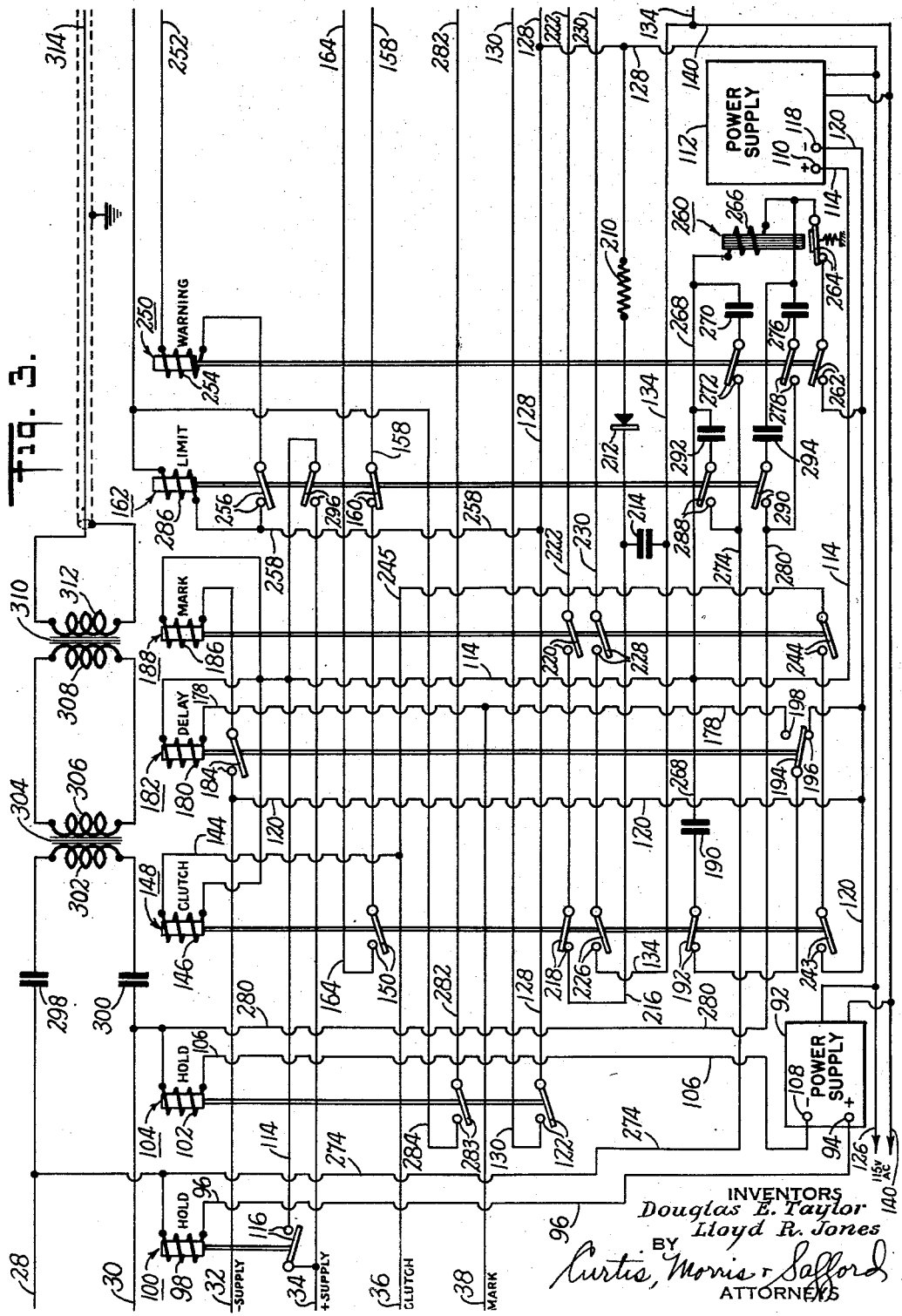

2,857,475
DICTATION SYSTEM

Douglas E. Taylor, Westport, and Lloyd R. Jones, Stepney Depot, Conn., assignors to Dictaphone Corporation, Bridgeport, Conn., a corporation of New York Continuation of application Serial No. 250,122, October 6, 1951. This application March 18, 1957, Serial No. 646,671

28 Claims. (Cl. 179—100.1)

This application is a continuation of our copending application Serial No. 250,122, filed October 6, 1951, now abandoned.

This invention relates to dictating equipment and more particularly to office-type dictating systems wherein several dictator stations are connected to remotely-positioned central sound recording apparatus. For example, each of several associated offices may be equipped with a microphone, a receiver, and the necessary controls and signal indicators, and a single central recording apparatus may be used to record the dictation from any of the offices.

In systems such as this, wherein the recording apparatus is positioned remotely from the person dictating and wherein a single sound recording machine is to be used by a number of persons each at a separate station, it is necessary to provide at the central station remotely-operable control means so that the dictator can operate the recording machine. At the same time it is necessary to prevent confusion or interference between the dictator station that is in use and the other stations. That is, when one of the dictator stations is in use and controlling the recording apparatus, the other stations are prevented from recording and from interfering with the control of the recording apparatus.

Several systems incorporating remotely-controlled dictating machines have been proposed, but in general they have utilized complex circuit arrangements. Such complicated systems are not useful commercially because of this high initial cost and because of the great skill required for proper servicing and maintenance of the apparatus.

In accordance with the present invention, a highly reliable and relatively simple and inexpensive system is provided that performs the desired functions and which is easily installed and maintained. In the embodiment of the invention to be described in more detail later, each dictator station is connected to the remotely-positioned sound recording apparatus by a six wire cable and all of the dictating stations are connected in parallel so that in most instances a single six wire cable extends from the central recording apparatus to each of the offices with relatively short branch wires extending between the main cable and the dictator stations.

The system is arranged so that when the central recording apparatus is not in use, its control can be taken over by any one of the dictator stations and once this control has been acquired it cannot be interrupted or interfered with from any of the other dictator stations, nor can a person "listen in" on the dictated material from another station.

The person dictating is able to control the recording apparatus as conveniently as if the dictating machine were positioned adjacent him, and a separate control button or switch is provided for each function so that it is unnecessary for the dictator to operate two control buttons or switches simultaneously to produce a third function. However, two control functions are combined in the electrical circuits to produce a third function, thus reducing the number of interconnecting leads; electrical interlocks being provided to prevent interference between the separate control circuits.

Suitable indications and signals are provided to apprise the person dictating of the condition of the recording apparatus. Thus, a signal light is provided at each dictator station to indicate that the recording apparatus is not in condition for use, as when a new record is needed, or that the system is being operated from another dictator station. When the end of the recording area of the record is approaching, an audible warning signal is provided in the receiver to warn the person who is dictating that only a limited amount of recording time remains. This warning signal is so faintly audible that it does not interfere with normal dictation. When the entire record has been used, a much louder audible signal is provided and the recording apparatus is switched off automatically.

These and other aspects, objects, and advantages of the present invention will be in part pointed out in and in part apparent from the following description of a preferred embodiment of the invention considered together with the accompanying drawings, in which:

Figure 1 represents diagrammatically a dictation system showing two dictator stations and the central recording and control apparatus;

Figure 2 shows schematically the portion of the circuit of the apparatus positioned at each of the dictator stations;

Figure 3 shows schematically the control and interlock circuits of a central control unit; and Figure 4 shows diagrammatically and schematically the recording apparatus and the associated circuits.

As shown in Figure 1, a desk-type telephone, generally indicated at 2, is positioned on a desk in an office, diagrammatically represented at 4. This telephone 2 is connected through a relay control unit, generally indicated at 6, and a cable 8 to remotely-positioned recording apparatus comprising a control unit, generally indicated at 12, and a dictating machine, generally indicated at 14.

Another telephone 2 and relay unit 6 are illustrated diagrammatically in an office 16 and are also connected to the remote dictating apparatus by means of the cable 8.

The representation of Figure 1 is intended to be diagrammatic and as many telephone units as desired may be connected to the cable 8. However, in most applications, it is not desirable to connect more than six to ten telephone units to a single recording apparatus.

When a person in office 4 wishes to dictate, he lifts the telephone hand set 18 and presses a clutch-operating thumb switch (not shown in Figure 1) which is mounted on the hand set 18. A correction marker switch 20 is provided on the base of the telephone 2 so that the person dictating can cause indications, for the guidance of the secretary during the transcription, to be produced on the top sheeet of a pad 22 of indicator slips on the dictating machine 14. A play-back switch 24 is also provided on the base of the telephone 2 so that the person dictating can reproduce the most recently recorded material.

If the hand set in the office 4 has been lifted from its receiver, a signal light 26 in the base of this instrument lights and corresponding signal lights in each of the other telephone sets are illuminated so that anyone else wishing to dictate will be informed that the dictating apparatus is already in use.

A privacy system is arranged so that when one of the telephone sets is being used for dictation, the lifting of any other of the hand sets will not interfere with the person using the dictating apparatus and so that it is impossible for any other person to "listen in" on the dictation. The electrical circuits of te dictating system are illustrated diagrammatically in Figures 2, 3, and 4 which form a single composite circuit by interconnection of the leads bearing corresponding numbers in the various figures.

When the dictating apparatus is not in use, and the telephone hand sets 18 are all in position on the respective telephone sets, a D.-C. voltage, for example of about 30 volts, exists between two voice channel lines 28 and 30 (Figure 2). The manner in which this voltage is provided will be explained subsequently. The leads 28 and 30, along with four other lines 32, 34, 36 and 38 form the interconnecting cable 8 and are connected to each one of the relay control units 6, and the telephone 2, in exactly the same manner. The components of Figure 2 represent the apparatus in each one of the remotely-positioned offices, that is, it represents diagrammatically the electrical apparatus contained in each relay control unit 6 and telephone set 2.

When the hand set 18 is removed from its cradle, indicated diagrammatically at 40 in Figure 2, cradle switch contacts 42 are closed, completing a circuit from the voice-channel line 28 through an actuating winding 44 of a privacy relay, generally indicated at 46, to the other voice-channel line 30; thus impressing the D.-C. voltage referred to above upon this relay.

Energization of the privacy relay 46 closes its contacts 48, completing a circuit from line 30 through relay contacts 48, a microphone 50 contained in the hand set 18, and an inductor 52, and the cradle switch contacts 42 to the line 28.

As will be explained later, the voltage applied to lines 28 and 30 is poorly regulated, as by connecting a substantial impedance in series with it, so that a relatively large drop in the D.-C. voltage occurs when a load is impressed on the lines by the actuation of the privacy relay 46. To this end, the resistance of the privacy relay winding 44 is preferably high compared with the resistance of the microphone 50 and the inductor 52. Thus, for example, the winding 44 may have a D.-C. resistance of the order of 500 ohms whereas the inductor 52 may have a resistance of the order of 20 ohms, and the microphone may have a resistance of the order of 50 ohms. Thus, when the relay 46 is actuated, the load impressed on the leads 28 and 30 by the connection of the microphone 50 and the inductor 52 across these leads is increased substantially. This increased load causes a marked reduction in the voltage appearing between leads 28 and 30. For example, if an initial potential of 30 volts is provided, this voltage may drop to a value of about 2 volts upon the energization of the privacy relay 46.

This relay 46 is arranged so that the lower voltage is sufficient to hold the relay in closed position but would be insufficient to actuate the relay to its closed position. Relays having the requisite characteristics are well-known, the large differential between closing and holding voltage being most readily obtained by utilizing a relay having a relatively large gap between the armature and the iron core of the relay.

The leads 28 and 30 are common to all of the other relay control units 6 in other offices and it is thus apparent that when any one of the relays 46 has been actuated, the voltage between lines 28 and 30 immediately drops to a value much lower than its initial value and which is insufficient to permit operation of any of the other privacy relays 46 when the associated hand set 18 is lifted.

The clutch switch referred to above and carried by the hand set 18 is illustrated diagrammatically at 54 in Figure 2. This switch is arranged to start and stop the dictating machine 14 so that the dictated material will be recorded in the usual manner.

Closing the clutch switch 54 completes a circuit which may be traced from a negative-voltage supply line 32 (from the negative terminal of a power supply to be described later), through contacts 56 of the privacy relay 46, an arm 58 and a contact point 60 of the marking switch 20, the clutch switch 54, an actuating winding 62 of a receiver relay, generally indicated at 64, and a current-limiting resistor 66 to the positive-voltage supply line 34, which is connected to the positive voltage terminal of the power supply mentioned above as will be explained later. No voltage exists between the leads 32 and 34 unless the privacy relay is energized, as will be shown later in connection with Figure 3. The signal lamp 26 is connected directly between the leads 32 and 34 so that this lamp, and the corresponding lamp at each of the dictating stations, is illuminated whenever any one of the privacy relays is closed.

Energization of the receiver relay 64 closes its contacts 68 and connects the receiver 70, of the hand set 18, across an inductor 72, one end of which is connected to one end of the inductor 52 and to a lead 73 extending between one terminal of the microphone 50 and one terminal of the head phone 70; the opposite end of the inductor 72 is connected through an inductor 74 and a condenser 76 to the other terminal of the microphone 50. The arrangement of the coupled inductors 52, 72, and 74 and the condenser 76 are well known and commonly used in the telephone art, and will not be described in detail here other than to point out that this arrangement attenuates the sound reproduced by the receiver 70 when the person is dictating, but which permits substantially increased volume in the receiver 70 when the sound is applied to the hand set from the lines 28 and 30, as during play back.

It will be noted that the receiver 70 is disconnected from the circuits unless the privacy relay 46 and the receiver relay 64 are energized so that any possibility of "listening-in" from another of the dictator stations is prevented.

When the clutch switch 54 is closed, energizing the receiver relay 64, the negative voltage from line 32 is connected by means of a lead 78 and receiver relay contacts 80 to the clutch-control line 36, which controls the clutch-operating circuits as will be explained presently.

When the marking switch 20 is actuated, moving the arm 58 into engagement with a contact 82, the negative voltage of line 32 is connected to the marking-control line 38 by a circuit which can be traced from line 32 through contacts 56 of the privacy relay 46, arm 58 and contact 82 of the marking switch 20, and switch contacts 84, operated by the cradle 40, to the marking-control line 38. This circuit is arranged, as will be explained presently, to actuate the correction marker, which is generally indicated at 86 on the dictating machine 14 in Figure 1.

When the play-back switch 24 is actuated, both the marking and clutch-control circuits are completed simultaneously and operate the play-back mechanism. A first circuit can be traced from the negative supply line 32 through contacts 56 of the privacy relay 46, contacts 88 of the play-back switch 24, and through the cradle switch contacts 84 to the marking-control line 38; thus applying the negative voltage of line 32 to the line 38. Simultaneously, the clutch circuit is completed which can be traced from line 32 through the privacy relay contacts 56, contacts 90 of the play-back switch 24, actuating winding 62 of the receiver relay 64, and through the current-limiting resistor 66 to the positive lead 34, thus energizing the receiver relay 64 and connecting the negative voltage of lead 32 through receiver relay contacts 80 to the clutch-control line 36.

The operation of the system to this point can be summarized as follows: When the privacy relay 46 is energized, by lifting the hand-set 18 from the cradle 40, the D.-C. voltage on lines 28 and 30 is reduced to such an extent that no other privacy relay can be energized, and a relay-operating voltage is caused to be applied to lines 32 and 34. When the clutch switch 54 is actuated, the negative supply lead 32 is connected directly to the clutch-control line 36. When a correction mark is to be made by actuating the switch 20, the negative voltage of lead 32 is applied to the marking-control line 38. When the play-back switch 24 is actuated both the clutch and marking circuits are completed to apply the voltage from the negative supply line 32 to the clutch-control line 36 and to the marking-control line 38. Simultaneous presence of these two control voltages actuates the play-back mechanism. This arrangement reduces the number of lines which must be connected between the central control unit 12 and the dictator stations.

Figure 3 illustrates diagrammatically the electrical apparatus which is contained in the central control unit 12 and which serves as the control apparatus for from six to ten dictating stations all of which are connected to the central control unit 12 of the dictating machine 14.

The voltage for operating the privacy relay 46 is provided by a power supply indicated in block form at 92. Since poor voltage regulation is a desired feature of this circuit, the power supply 92 may include a conventional resistance-capacitance filter circuit. This filtering should be such as to remove substantially all of the A.-C. ripple as the voltage is applied to the same lines that carry the voice signals. The positive supply terminal 94 of the power supply is connected through a lead 96, an actuating winding 98 of a holding relay, generally indicated at 100, to the voice-channel line 28, which, when the cradle switch contacts 42 are closed (Figure 2), is connected through the privacy relay winding 44 to the other voice-channel line 30. This line 30 is connected (Figure 3) through a winding 102 of a second holding relay, generally indicated at 104, and a lead 106, to the negative supply terminal 108 of the power supply 92. When the privacy relay 46 is actuated, as explained above, placing a relatively low resistance load between the lines 28 and 30, sufficient D.-C. current flows through the holding relays 100 and 104 to actuate them and close their respective contacts.

When the holding relay 100 is energized, the relay-operating voltage is applied between leads 32 and 34 by a circuit which can be traced from a positive output terminal 110 of a power supply, indicated in block form at 112, through a lead 114, and contacts 116 of the holding relay 100, to the positive supply line 34, which is connected, as shown in Figure 2, to the actuating winding 62 of the receiver relay 64. The negative terminal 118 (Figure 3) of the power supply 112 is connected by a lead 120 directly to the negative supply line 32, which as shown in Figure 2 is connected to the marking, play-back and clutch-control circuits. Because the power supply 112 provides voltage for operating relays, it need not have as complete filtering as the power supply 92, but it should have good regulation.

The other holding relay 104 is provided with a set of contacts 122 which complete the power circuit for a motor 124, shown in Figure 4, of the dictating machine 14. This circuit can be traced from a 115 volt A.-C. power main 126 (Figure 3) through a lead 128, the contacts 122 of the holding relay 104, a lead 130, to one terminal of the motor 124 shown in Figure 4. The other terminal of this motor is connected by a lead 132 and a common supply lead 134 to the other alternating current supply main 140 (Figure 3). Thus, whenever the hand set 18 is removed from its cradle, the holding relay 104 energizes the dictating machine motor 124.

The supply mains 126 and 140 are connected in the usual manner to energize the power supplies 92 and 112, it being understood that a suitable main switch and fusing arrangement will be included, these components having been omitted from the showing in order to simplify the drawings.

As explained above, when the clutch switch 54 (Figure 2) is actuated, the receiver relay 64 is energized and the negative voltage on line 32, from the negative terminal 118 of the relay power supply 112, is connected to the clutch-control line 36. As shown in Figure 3, the line 36 is connected by a lead 144 to one end of the actuating winding 146 of a clutch-operating relay, generally indicated at 148. The other end of the winding 146 is connected through the lead 114 to the positive terminal 110 of the power supply 112.

The clutch-operating relay 148 thus is energized closing its contacts 150 and completing a clutch-actuating circuit that can be traced from the positive terminal 152 (Figure 4) of a power supply, indicated diagrammatically at 154, which is included as a portion of a conventional type dictating-machine amplifier assembly, indicated generally in block form at 156, through a lead 158, the normally-closed contacts 160 (Figure 3) of a limit relay, generally indicated at 162, contacts 150 of the clutch-operating relay 148, a lead 164 (Figure 4), a current-limiting resistor 168, an actuating winding 170 of a solenoid-operated clutch, indicated diagrammatically at 172, and a lead 174 to the negative terminal 176 of the power supply 154, which is connected also directly to the supply main 140.

When the clutch-operating solenoid 170 is energized, the clutch 172 couples the motor 124 mechanically to the driving mandrel of the dictating machine 14 in the usual manner.

When the marking switch 20 (Figure 2) is actuated, the negative voltage on line 32, from the relay power supply 112, is connected to the marking-control line 38 as explained above.

The line 38 (Figure 3) is connected by a lead 178 to one terminal of an actuating winding 180 of a delaying relay, generally indicated at 182, the other terminal of which is connected by the lead 114 to the positive terminal 110 of the relay power supply 112.

When the winding 180 of the delaying relay is energized its contacts 184 are closed, completing a circuit from the negative terminal 118 of the power supply 112 through the lead 120, delaying relay contacts 184, an actuating winding 186 of a marking relay, generally indicated at 188, and the lead 114 to the positive terminal 110 of the power supply 112.

Thus, when the delaying relay 182 is energized, it causes energization of the marking relay 188, but a short time delay is introduced because of the time required for actuation of the delaying relay. The reason for this time delay will be made clear presently.

If the marking switch 20 (Figure 2) were closed for a very short interval of time, the marking relay 188 might not remain closed long enough to insure that a good correction mark would be produced. In order to obviate this difficulty, a condenser 190, for example, of electrolytic type and having a capacity of 180 microfarads, is arranged to discharge through the energizing winding 180 of the delaying relay 182 each time the marking switch 20 is actuated, thus insuring that the marking relay will stay closed long enough to make a good mark.

One terminal of the condenser 190 is connected through the lead 114 directly to the positive terminal 110 of the power supply 112, and its other terminal is connected through a pair of normally-closed contacts 192 of the clutch relay 148 and arm 194 and contact 196 of the delaying relay 182 to the negative terminal 118 of the power supply 112. Thus, the condenser 190 normally is charged to the voltage delivered by the power supply 112.

When the delaying relay 182 is energized, its contact arm 194 is switched from contact 196 to a contact 198 that is connected through the delaying relay winding 180 to the positive terminal 110 of the power supply 112. The condenser 190 then discharges through the winding 180, maintaining the energization of the delaying and marking relays during this time which is sufficient to produce a clear correction mark even if the marking switch is closed only for a moment.

The correction marks for the guidance of the secretary are, as usual, made upon the top sheet of the pad 22

(Figure 4) on the front of the dictating machine 14. The marking mechanism is actuated by a pivotally-supported bail 202 which is arranged to move a lever 204 of a conventional marking device 206, the bail 202 being operated by a solenoid, generally indicated at 208. This entire marking assembly is indicated diagrammatically, it being understood that any desired apparatus can be used to produce the marks.

Power for operating the marking solenoid 208 is provided by a rectifier-filter circuit (Figure 3) including a series resistor 210, a dry disk-type rectifier 212 and a condenser 214.

The alternating current supply main 126 is connected through the resistor 210, for example of about 300 ohms, and the half-wave rectifier 212 to one terminal of the condenser 214, the other terminal of which is connected directly to the other supply main 140. When there is no load upon this circuit, the condenser 214 is charged to the peak voltage of the alternating current source. When the marking relay 188 is energized, the condenser 214 is connected to the solenoid 208 and discharges quickly through the solenoid. The condenser 214 is relatively large, for example, of 100 or 200 microfarads, so that the surge of current through the marking solenoid is adequate to operate the marking device, but the voltage drop across the series resistor 210, under load conditions, prevents continued effective energization of the marking solenoid 208. Thus, the marking device produces a single indicating mark each time the marking switch 20 is closed, but no further marks are produced even if the marking switch 20 remains in the closed position.

The energizing circuit for the marking solenoid 208 can be traced from the supply main 128 through the voltage-dropping resistor 210, the rectifier 212, a lead 216, normally-closed contacts 218 of the clutch-operating relay 148, contacts 220 of the marking relay 188, a lead 222, the solenoid 208 (Figure 4), and lead 134 to the other supply main 140.

As was explained in connection with Figure 2, when the play-back switch 24 is actuated, the negative voltage of line 32, from the power supply 112, is connected to the clutch-control line 36 and also to the marking-control line 38. The play-back switch 24 thus causes energization of the clutch-operating relay 148 and also of the marking relay 188, through the delaying relay as described above. Simultaneous energization of the clutch-operating and marking relays energizes the play-back circuits of the dictating machine 14.

The connection between line 32 and the line 36, caused by closing the play-back switch 24, completes a circuit that can be traced from the negative terminal 118 of the relay power supply 112 (Figure 3) through the lead 120, line 32, line 36 (by means of the circuits shown in Figure 2), lead 144, the actuating winding 146 of the clutch-operating relay 148, and the lead 114 to the positive terminal 110 of the power supply 112. This energizes the clutch-operating circuits as described previously, starting rotation of the record-driving mechanism of the dictating machine 14.

The other connection, also caused by the closing of the play-back switch contacts, between the negative supply line 32 and the marking-control line 38 energizes the delaying relay 182 by a circuit that can be traced from the negative terminal 118 of the relay power supply 112 through a lead 120, the line 32, the line 38 (through the circuits of Figure 2), the lead 178, the actuating winding 180 of the delaying relay 182, and the lead 114 to the positive terminal 110 of the relay power supply 112. As previously explained, the closing of the delaying relay contacts 184 completes the circuit energizing the marking relay 188.

Although the closing of play-back switch contacts causes simultaneous energization of the clutch-operating and marking circuits, the clutch-operating relay 148 is actuated before the marking relay 188 because of the time delay interval introduced by the delaying relay 182. Under these circumstances, the marking relay 188 does not cause energization of the marking solenoid 208 (Figure 4) because the clutch-operating relay opens its contacts 218 which are connected in series with the circuit by which the marking solenoid 208 is energized. This does not interfere with the normal operation of the marking circuit because the correction marks are made only when the clutch-operating relay is de-energized.

When the clutch-operating and marking relays 148 and 188 are both energized, a circuit is completed that can be traced from the negative terminal 176 of the power supply 154 (Figure 4), in the dictating machine 14, through the lead 134, clutch-operating relay contacts 226 (Figure 3), marking relay contacts 228, a lead 230, an actuating winding 232 (Figure 4) of a solenoid-operated record-reproduce switch, diagrammatically and generally indicated at 234, a current-limiting resistor 236, the lead 164, the clutch-operating relay contacts 150 (Figure 3), the normally-closed limit relay contacts 160, and the lead 158 to the positive terminal 152 of the power supply 154 (Figure 4).

The switch 234 is arranged in conventional manner to shift the electronic circuits from the recording to the reproducing arrangement and to disconnect the recording head 238 and to connect the reproducing head 240 which is arranged to track the record, in this example illustrated as a flexible belt at 242, a short distance behind the recording head 238 so as to play back the most recently recorded material. It is to be understood that this portion of the apparatus is illustrated only diagrammatically for the reason that any desired play-back mechanism can be used, for example, one in which a ratchet or other mechanism is provided to backspace the reproducing head.

During play back, both the marking relay 188 and the clutch-operating relay 148 are energized as described above. At the end of the play-back operation, if the clutch operating relay 148 were de-energized before the marking relay 188, the marking circuits would be effective through the clutch relay contacts 218 to cause an unwanted correction mark to be made. This possibility is obviated by the provision of a holding circuit for the clutch-operating relay 148 that maintains the energization of the clutch relay until the marking relay 188 has been de-energized.

This holding circuit can be traced from the negative terminal 118 of the power supply 112 through the lead 120, clutch-operating relay contacts 243, marking relay contacts 244, a lead 245, the lead 144, the winding 146 of the clutch-operating relay 148, and the lead 114 to the positive terminal 110 of the power supply 112. Energization of the clutch relay 148 is thus maintained until the marking relay 188 is de-energized to open the holding circuit contacts 244.

Because the dictating machine 14 is positioned remotely from the operator, it is particularly important that the operator be informed when the recording head is nearing the end of the record. The present system provides for two signals, a first low-level audible tone in the telephone receiver 70 (Figure 2) indicating that a predetermined amount of recording time remains on the record, for example, one minute. At the end of the recording time, a high-level audio signal is reproduced by the receiver 70 and the recording mechanism is switched off simultaneously.

As is indicated diagrammatically in Figure 4, an arm 246 supported by the reproducing-recording head carriage 247 is arranged to open the contacts of a warning switch 248 as the carriage 247 nears the end of the usable recording area of the record.

This switch 248 controls the energization of an alternating-current warning relay, generally indicated at 250 in Figure 3, through a circuit that can be traced from the alternating current supply main 140 through the lead 134 (Figure 4), the warning switch 248, a lead 252 (Figure 3), an actuating winding 254 of the warning relay 250, contacts 256 of the limit relay 162, and leads 258 and 128 to the supply main 126.

The contacts of the warning switch 248 are normally closed so that the warning relay 250 is energized. As the carriage 247 approaches the end of the record, the switch 248 is actuated to its open position, de-energizing the warning relay 250.

The audible warning signal is produced by a conventional type buzzer, generally indicated at 260, which is energized, when the warning relay 250 is de-energized by a circuit that can be traced from the negative terminal 118 of the relay power supply 112 through warning relay contacts 262, buzzer contacts 264, a buzzer-actuating winding 266, a lead 268, and the lead 114 to the positive terminal 110 of the power supply 112.

The audio frequency signal developed across the winding 266 of the buzzer 260 is coupled to the audio leads 28 and 30 by a balanced circuit that can be traced from one end of the winding 266 through a coupling condenser 270, warning relay contacts 272, and a lead 274 to the voice-channel line 28. The other portion of this circuit can be traced from the opposite end of the buzzer winding 266 through a coupling condenser 276, warning relay contacts 278, and a lead 280 to the line 30.

The warning-signal coupling condensers 270 and 276 are selected with such capacities that the audio signal is only faintly heard in the receiver 70 and of such low amplitude that it does not interfere with the normal dictating procedures. Each of these condensers may have, for example, a capacity of 100 micromicrofarads. The warning signal may be continuous for the remainder of the recording time or it may provide only a momentary signal, depending upon whether the arm 246 is arranged to retain the warning switch 248 in open position.

When the carriage 247 has moved to a position where substantially the entire recording area of the record has been used, the arm 246 strikes a limit switch 281 and de-energizes the limit relay 162. The circuit by which the limit relay 162 is normally energized can be traced from the power main 140 through the lead 134, the limit switch 281, a lead 282, holding relay contacts 283 (Figure 3), a lead 284, an actuating winding 286 of the limit relay 162, and the leads 258 and 128 to the other supply main 126.

When the arm 246 strikes the limit switch 281, interrupting this circuit, the limit relay 162 is de-energized closing its contacts 288 and 290 and providing increased coupling between the opposite ends, respectively, of the buzzer winding 266 and the leads 28 and 30 through two additional coupling condensers 292 and 294. These condensers 292 and 294 are of substantially greater capacity than the condensers 270 and 276 and, for example, may have a capacity of the order of two thousand micromicrofarads. This increased coupling produces a relatively loud warning signal in the receiver 70 indicating that no further recording is possible until the record 242 has been replaced.

When the limit relay 162 is de-energized, its contacts 160, which are in the energizing circuit for the clutch 172, are opened, thus preventing further energization of the clutch.

The signal lamps 26 (Figures 1 and 2) at each dictating station are energized through the holding relay contacts 116 (Figure 3) whenever any one of the dictating stations is in use. This lamp 26 is energized also whenever the record 242 is filled, that is, whenever the limit relay 162 is de-energized, irrespective of whether any dictating station is in use. This is accomplished by the limit relay contacts 296, which are connected in parallel with the holding relay contacts 116.

The audio signals impressed on the balanced line formed by the leads 28 and 30 during dictation, develop corresponding signal voltages across the resistances offered by the windings 98 and 102 of the holding relays 100 and 104.

These voltages are transferred to the amplifier circuits of the dictating machine 14 by an isolating and impedance matching network including two condensers 298 and 300 which are connected, respectively, to the leads 28 and 30 and to the opposite terminals of a primary winding 302 of an audio transformer 304, the secondary winding 306 of which is connected to the primary winding 308 of another audio transformer 310. The secondary winding 312 of the transformer 310 is connected by a shielded cable 314 to the amplifier circuits of the dictating machine.

It will be noted that the lines 28 and 30 are balanced and terminated symmetrically at each end so that the lines can be placed near telephone or other interoffice wires without picking up objectionable cross-talk or hum.

Two holding relays 100 and 104 have been illustrated although a single relay can be used provided a corresponding impedance is used to replace the relay winding. These relays have a resistance, in this example, of about 500 ohms so that they provide an adequate signal load impedance and produce the desired poor voltage regulation characteristics.

From the foregoing, it will be observed that the dictating system embodying the following claimed invention is well adapted for the attainment of the ends and objects hereinbefore set forth and that it can be installed and maintained easily and economically.

What is claimed is:

1. In an office-type dictating system wherein recording apparatus is connected to a plurality of remotely-positioned dictating stations, apparatus comprising a plurality of microphones at least one of which is positioned at each of said remote stations, a line extending between said recording apparatus and each of said remote stations, a plurality of relay means, a plurality of switch means each of which is associated with one of said relay means to be operated upon actuation of its associated relay means and each of which is coupled to one of said microphones and to said line and each of which, upon actuation of its associated relay means, connects its associated microphone through said line to said recording apparatus, a voltage source for actuating said relay means, interconnecting means coupling said voltage source to each of said relay means, and means responsive to the actuation of any one of said relay means for reducing the operating voltage applied through said interconnecting means to each of said relays from said source below the minimum value effective to initiate actuation of any one of said relay means.

2. In an office-type dictating system wherein recording apparatus located at a central station is connected to a plurality of remotely-positioned dictating stations, apparatus comprising a plurality of signal transducing devices, at least one of which is positioned at each of said remote stations, a connection extending between said recording apparatus and each of said remote stations, a plurality of relay means, all requiring substantially the same predetermined minimum operating voltage, a plurality of switch means each of which is associated with one of said relay means and operated thereby each of said switch means being coupled to one of said signal transducing devices and to said connection and operated upon actuation of its associated relay means to connect its associated signal transducing device to said connection to said recording apparatus, a source of voltage at least equal to said minimum operating voltage, interconnecting means coupling said voltage source to each of said relay means, effectively high impedance in circuit with said voltage source and said interconnecting means and effectively lower impedance associated with each of said signal transducing means and responsive to the operation of any one of said relay means to be applied to said interconnecting means for reducing the operating voltage applied to each of said relay means from said source below the minimum value effective to operate any one of said relay means.

3. In an office-type dictating system wherein recording apparatus located at a central station is connected to a plurality of remotely-positioned dictating stations, apparatus comprising a plurality of microphones one of which is positioned at each of said remote stations, a connection between said recording apparatus at the central station and each of said remote stations, a plurality of relay means, all requiring substantially the same predetermined minimum operating voltage, each of said relay means being connected between one of said microphones and said connection and arranged upon actuation to connect its associated microphone through said connection to said recording apparatus, a source of voltage at least equal to said minimum operating voltage, interconnecting means coupling said voltage source to each of said relay means, and impedance means connected in series with said voltage source and having impedance to reduce the voltage applied to each of said relay means from said voltage source to a value below said minimum operating voltage.

4. In an office-type dictating system wherein the sound recording apparatus is located at a central station and connected to a plurality of remotely-positioned dictating stations, apparatus comprising a plurality of telephones each having a hand set and microphone, one of said telephones being positioned at each of said remote stations, a plurality of privacy relays having open and closed conditions of operation, all of said relays requiring substantially the same predetermined minimum operating voltage for causing their operation from open to closed condition and requiring substantially the same lesser voltage for holding them in the closed condition, each of said relays being connected in circuit between one of said microphones and said recording apparatus and arranged in closed condition to connect its associated microphone to said recording apparatus, a source of voltage greater than said minimum operating voltage, a plurality of switches each positioned in one of said telephones and responsive to the lifting of the associated hand set to connect the associated relay to said voltage source, and means responsive to the operation of any one of said relays into closed condition for reducing the operating voltage applied to each of said relays from said source to a value below the minimum operating value and above the holding value for holding said one relay means in its actuated condition while preventing the actuation of any other of said relays.

5. An office-type dictating system comprising a plurality of separate dictating stations each including electro-acoustical transducer means, a central sound recording station positioned remotely from said dictating station including a record, a recording head for impressing sound signals on said record, and a recording amplifier connected to said recording head and supplying amplified sound signals thereto, a balanced signal-transmission line extending between each of said transducers and the recording amplifier, an audio signal generator positioned at said central station and having a pair of output terminals, a pair of coupling condensers each of substantially equal capacitance, and a pair of switch means, each of said switch means being in circuit with one of said output terminals, one of said condensers, and one side of said transmission line to connect one of said condensers between each of said terminals and the transmission line, said switch means being responsive to the positioning of the recording head near the end of the recording area on said record.

6. In an office-type remote-control dictating system wherein sound recording apparatus is located at a central station and connected to a plurality of remotely-positioned dictating stations, signalling apparatus comprising sound recording apparatus positioned at said central station and having first and second conditions of operation, an audio frequency generator located at said central station and arranged to produce an electrical signal of audio frequency, a pair of output terminals on said generator, a transmission line extending from said sound recording apparatus to said remotely-positioned stations, first and second pairs of coupling condensers, the condensers of said first pair being of substantially equal and relatively small capacitance and the condensers of said second pair being of substantially equal and relatively large capacitance, a first pair of switch elements under the control of said sound recording apparatus, each of said switch elements of said first pair being in circuit with one of said output terminal, one of said condensers of said first pair and one side of said transmission line to connect said first pair of condensers between said terminals and said transmission line when said recorder is in said first condition of operation, and a second pair of switch elements under the control of said sound recording apparatus, each of said switch elements of said second pair being in circuit with one of said output terminals, one of said condensers of said second pair and one side of said transmission line to connect said second pair of condensers between said terminals and said transmission line when said recorder is in said second condition of operation.

7. An office-type dictating system comprising a plurality of separate dictator stations each including a transmitter and a receiver, a central sound recording station positioned remotely from said dictator stations including a record, a recording head, and an amplifier connected to said head for supplying amplified electrical signals thereto, a balanced signal-transmission line extending between the transmitter and receiver at each of said dictator stations and said amplifier, an audio signal generator positioned at said central station, a pair of output terminals on said generator, two pairs of coupling condensers, the condensers of each of said pairs being of substantially equal capacitance and the condensers of one of said pairs being of substantially greater capacitance than those of the other pair, switch means for connecting one of the condensers of each pair between one of said output terminals and the transmission line and the other condenser of each pair between the other output terminal and the transmission line, said switch means being responsive to the positioning of the recording head near the end of the recording area of said record to connect said first pair of condensers between said terminals and the transmission line for sending a relatively low energy audio signal to said receivers, and said switch means being responsive to the positioning of the recording head at the end of the recording area of said record for connecting the other pair of condensers between said terminals and the transmission line for transmitting to said receivers an audio signal of relatively increased energy.

8. In an office-type central-station dictating system wherein sound recording and reproducing apparatus located at a central station is connected to a remotely-positioned dictating station, apparatus comprising a marking circuit, a marking relay having first circuit control elements with released and actuated positions and controlled by said circuit to change said first circuit control elements from released to actuated position, a clutch circuit, a clutch relay having second circuit control elements with released and actuated positions and controlled by said clutch circuit to change said second circuit control elements from released to actuated position, a playback mechanism in circuit with said first and second circuit control elements so as to be under the control of both of said relays to be energized when said first and second circuit control elements of each of said relays is in its actuated position, and a manual play-back control located at said dictating station, switch means in circuit with both said marking and clutch circuits and under the control of said manual play-back control, whereby operation of said manual play-back switch energizes both said marking and clutch circuits to place said first and second circuit control elements of said marking and clutch relays in actuated position whereby said play-back circuit is energized.

9. In an office-type central-station dictating system wherein sound recording and reproducing apparatus located at a central station is connected to a remotely-positioned dictating station, apparatus comprising a marking relay having first circuit control elements with released and actuated positions and controlled by said circuit to change said first circuit control elements from released to actuated position, a clutch circuit, a clutch relay having second circuit control elements with released and actuated positions and controlled by said clutch circuit to change said second circuit control elements from released to actuated position, a play-back mechanism in circuit with said first and second circuit control elements so as to be under the control of both said relays to be energized when said first and second control elements of each of said relays is in its actuated position, a manual play-back control located at said dictating station, switch means in circuit with both said marking and clutch circuits and under the control of said manual play-back control, whereby operation of said manual play-back switch energizes both said marking and clutch circuits to place said first and second circuit control elements of said marking and clutch relays in actuated position to energize said play-back circuit, time-delay means connected to said marking relay for preventing the actuation of said marking relay until said clutch relay is in its actuating position, and a holding circuit arranged to maintain the clutch relay in actuated position until the marking relay has returned to its released position.

10. Apparatus as claimed in claim 9 wherein said time delay means comprises a relay having contacts arranged to energize said marking relay.

11. In an office-type central-station dictating system wherein sound recording and reproducing apparatus located at a central station is connected to a plurality of remotely-positioned dictating stations, apparatus comprising a play-back circuit arranged to reproduce said recorded sound, a marking circuit including a marking relay having released and actuated conditions, a pair of relay contacts on said marking relay and forming a conductive path therebetween when said relay is in its actuated condition, a clutch circuit including a clutch relay having released and actuated conditions, a pair of relay contacts on said clutch relay and forming a conductive path therebetween when said clutch relay is in its actuated condition, and means for energizing said marking and clutch relays to place them in their actuated positions, means under the control of said relays arranged to energize said play-back circuit when both of said relays are in their actuated conditions, a holding circuit arranged to energize the clutch relay to hold it in actuated condition, said holding circuit being completed by conductive paths including said relay and clutch contacts connected in series, said holding circuit being independent of the marking and clutch control circuits.

12. An office-type dictating system as claimed in claim 1 and wherein each of said microphones has an effectively small impedance and said voltage source has an effectively large impedance in circuit therewith, and wherein each of said switch means when operated by its associated relay means connects its associated microphone in circuit with said interconnecting means, whereby the low impedance of said microphone reduces the operating voltage on said interconnecting means below the minimum value effective to initiate actuation of any one of said relay means.

13. In an office-type dictating system wherein a recording machine is connected to a plurality of remote stations so that communication may be made from any one of said stations to said recording machine and wherein each station includes sound transducing means through which said communication is made, apparatus enabling communication to be made through the transducing means at any one of said stations and for preventing simultaneous communication to be made with said recording machine through the transducing means at any other station, comprising a first line extending between said remote stations, a voltage source, said voltage source being connected to said first line, a second line extending from said recording machine to all of said stations, a plurality of relay means each operatively associated with one of said stations and each including circuit control means which operate upon actuation of the relay means, each of said circuit control means being connected between said second line and its associated sound transducing means at the associated station, to couple its associated sound transducing means to said second line upon actuation of the relay means, a plurality of controls, each control being operatively related to one of said stations and being in circuit with said first line and the relay means at the associated station, whereby operation of means at any one of said controls actuates the associated relay means to operate its circuit control means to couple the associated sound transducing means to the second line, and means responsive to the actuation of any one of said relays for reducing the operating voltage on said first line below the minimum value effective to initiate actuation of any one of said relay means.

14. An office-type dictating system as claimed in claim 13 and wherein said first and second lines comprise a voice channel connected to said recording machine, said relay means are privacy relays, the windings of said privacy relays have a relatively high impedance, all of said privacy relays require substantially the same predetermined minimum operating voltage for causing their operation from open to closed condition and require substantially the same lesser voltage for holding them in the closed condition, and said voltage source has a value at least as high as said minimum operating voltage but has poor regulation, said voltage source is connected between said lines of said voice channel, each of said controls is a manually-operable switch in circuit between one of said lines and one side of the winding of its associated privacy relay, with the other side of said winding connected to the other line, each of said circuit control means is a switch in the privacy relay, each of said privacy relay switches is connected in series with said sound transducing means from one to the other of said lines, and the means for reducing the operating voltage is a relatively low impedance path through any one of said sound transducing means when its privacy relay switch is closed, whereby when one of said privacy relays is actuated, said sound transducing means is connected to the voice channel and the operating voltage on said voice channel is reduced to a value below the minimum operating value and above the holding value, thus holding said one relay in its actuated condition while preventing the actuation of any other of said privacy relays.

15. In an office type dictating system wherein a recording machine at a central station is connected to a plurality of remote stations so that communication may be made from any one of said remote stations to said recording machine and wherein each remote station includes sound transducing means through which said communication is made, apparatus enabling communication to be made through the transducing means at any one of said stations and for preventing simultaneous communication to be made with said recording machine through the transducing means at any other station comprising: a voice channel connected to said recording machine, a plurality of relay means, all requiring substantially the same predetermined minimum voltage to initiate actuation, each of said relay means controlling a switch connected in circuit with one of said sound transducing means and said voice channel, a voltage source for actuating said relay means, interconnecting means connecting said voltage source to each of said relay means, a low impedance current path at each of said remote stations connected in series with a switch operated by the associated relay means and said interconnecting means, whereby actuation of any one of said relay means connects said low impedance current path to said interconnecting means to reduce the voltage applied from said source to each of said relay means below the minimum value effective to initiate actuation of any one of said relay means.

16. A dictating system comprising a plurality of separate dictator stations, each including a pair of output terminals, a sound transducer, first relay means including normally-inoperative contacts which are made operative upon actuation of the associated relay means, said contacts being connected in circuit between said sound transducer means and said output terminals, a remotely positioned central station including a sound recording machine, means for controlling said sound recording machine including, a voice channel transmission line extending between said central station and the output terminals of each of said dictator's station, a source of power connected to said transmission line, and a switch means at each of said dictator's station arranged to connect each of said first relay means through said transmission line to said source of power for actuating each of said first relay means to connect said sound transducer to its respective output terminals.

17. A dictating system as claimed in claim 16 and wherein each of said first relay means includes other normally-inoperative contacts, and including a control circuit extending between said machine and each of said other contacts, whereby operation of any switch means also makes said other contacts in said control circuit operative.

18. In a remotely-controlled multistation phonographic system including a source of potential: the combination of an attendant's station including a phonographic machine; a plurality of remote operators' stations each including a transducer and an on-off station switch; circuit means including branch circuits leading from said remote stations respectively for connecting said remote stations to said machine when the respective station switch is closed; means for supplying energizing potential to said branch circuits from said potential source; respective disabling switches connected to said branch circuits and movable into effective and ineffective positions for rendering inoperative and operative the respective remote stations; respective electrically-energizable devices for operating said disabling switches normally positioned to render the stations inoperative and connected in the respective branch circuits for operation by said potential source to render the respective stations operative upon closure of the respective station switches; and means connected in circuit with said potential source and effective upon closure of one of said branch circuits for reducing the voltage to said branch circuits to a value insufficient to operate any subsequent one of said energizable devices.

19. In a remotely-controlled multistation phonographic system including a source of D.-C. potential: the combination of an attendant's station including a phonographic machine; a plurality of remote operators' stations each including a transducer and an on-off station switch; circuit means including respective branch circuits leading from said remote stations respectively for connecting said remote stations to said machine when the respective station switch is closed; means connecting said potential source to said circuit means for supplying energizing potential to each of said branch circuits; resistance means connected in circuit with said potential source to cause a substantial decrease in the line voltage at the remote stations when one of said branch circuits is closed; respective relays for said remote stations connected in the respective branch circuits for operation by said potential source as the respective station switches are closed, each of said relays having a voltage characteristic such that it is operable by the open circuit line voltage existing in said branch circuits when the first of said circuits is closed and such that it is inoperable by the line voltages at the remote stations when another one of said station switches is already closed; and switch means in each relay for connecting the respective transducer to said machine as the relay is operated.

20. In a remotely-controlled multistation phonographic system including a source of potential: the combination of an attendant's station including a phonographic machine; a plurality of remote operator's stations each including a transducer and an on-off station switch; circuit means including branch communication circuits leading from said remote stations respectively for connecting any selected one of said transducers to said machine via the respective station switch and branch circuit when that station switch is in "on" position; means connecting said potential source to said circuit means to supply energizing potential to each of said branch circuits; a relay at each of said remote stations having a coil connected for energization by said potential source via the respective branch circuit and station switch when the station switch is in "on" position; means connected to said potential source to cause a substantial drop in potential in said branch circuits at said remote stations when one of said relays is connected in circuit, each of said relays having a voltage operating characteristic causing the relay to operate from the initial voltage available as the first of said station switches is moved to "on" position and to be inoperable by the voltage available after one of said relays is connected in circuit; and each relay including switch means connected in the respective branch circuit for disconnecting the respective transducer therefrom when the relay is not operated and for connecting the respective transducer thereto when the relay is operated.

21. In a remotely-controlled multistation phonographic system including a D.-C. source of potential: the combination of an attendant's station including a phonographic machine; a plurality of remote operators' stations each including a transducer and a station switch movable into "on" and "off" positions; means connected to said potential source for supplying standby power to each of said remote stations; means responsive to movement of any one of said station switches to "on" position for activating said phonographic machine for use; a station conditioning relay at each remote station normally in a station disabling position and effective when operated to render the station operative, each of said relays being operable at the normal voltage of said potential source and being inoperable at voltages substantially lower than that of said source, and each of said relays being connectible to said potential source via the respective station switch as the latter is moved to "on" position; and resistance means in the circuit of said potential source effective upon one of said relays being operated to cause the voltage available at the remaining remote stations to be insufficient to operate any of the remaining conditioning relays.

22. In an office-type central-station dictating system wherein sound recording and reproducing apparatus located at a central station is connected to a remotely-positioned dictating station, apparatus comprising a first control circuit, a first function relay having first circuit elements with off and on positions and controlled by said first control circuit to change said first circuit elements from off to on position, a second control circuit, a second function relay having second circuit elements with off and on positions and controlled by said second control circuit to change said second circuit elements from off to on position, a function-operating mechanism in circuit with said first and second circuit elements so as to be under the control of both of said relays to be energized when said first and second circuit elements of each of said relays are in their on positions, a manually-operable device located at said dictating station, and first and second switch means in circuit with said first and second control circuits respectively, both of said switch means being concurrently actuable by said manually-operable device whereby operation of said manually-operable device simultaneously switches both said control circuits to place said first and second circuit elements of said relays in their on positions so that said function-operating mechanism is energized.

23. Apparatus as claimed in claim 22, including time delay means for said first function relay for preventing the actuation of said first circuit elements to their on position until after said second circuit elements have been placed in their on position.

24. Apparatus as claimed in claim 22, including a holding circuit arranged to maintain said second circuit elements in their on position until said first circuit elements have returned to their off position.

25. A remotely-operated dictation system which includes centrally-located recording and control equipment wherein a recording head is arranged for relative travelling movement with respect to a moving record, apparatus comprising, in combination, a plurality of remote dictator's instruments each including a microphone and an on-off switch, circuit means for connecting any one of said instruments to said recording and control equipment, said circuit means being completed when the on-off switch at said one instrument has been placed in "on" position, privacy switch means at each of said instruments and movable into effective and ineffective positions for rendering inoperative and operative the respective remote instruments, a privacy relay at each of said instruments for controlling said privacy switch means, the windings of said privacy relays being connected to said circuit means to be energized by current flowing therethrough, a source of energizing potential at said recording and control equipment and connected to said circuit means for transmitting current to said privacy relays when said circuit means has been completed in response to the operation of the on-off switch at one of said instruments to its "on" position, and control means associated with said circuit means and operable in response to the completion of said circuit means when the on-off switch at one instrument has been placed in "on" position, said control means being arranged to control the activation of said privacy relays so that the privacy switch means at said one instrument is conditioned in ineffective position and the privacy switch means at all other instruments are conditioned in effective position, whereby the dictator first to operate his on-off switch has an exclusive channel through said circuit means to said recording and control equipment.

26. In a remotely-controlled multistation phonographic system, the combination of: an attendant's station including a phonographic machine; a source of potential at said attendant's station; a plurality of remote operators' stations each including a transducer and an on-off station switch; circuit means including branch circuits leading from said remote stations respectively for connecting said remote stations to said attendant's station when the respective station switch is in "on" position; means for supplying energizing potential to said branch circuits from said potential source; respective disabling switches connected to said circuit means and movable into effective and ineffective positions for rendering inoperative and operative the respective remote stations; respective electrically-energizable devices for operating said disabling switches and connected in the respective branch circuits for operation by current from said potential source; and means for controlling the flow of current to said electrically-energizable devices in response to actuation of one of said on-off switches to its "on" position, said means being adapted to establish current flow to condition said electrically-energizable devices so as to render inoperative all of said remote stations except the station associated with said one on-off switch.

27. In a remotely-controlled multistation phonographic system, the combination of: an attendant's station including a phonographic machine; a source of potential at said attendant's station; a plurality of remote operators' stations each including a transducer and an on-off station switch control; circuit means including at least first and second pairs of lines leading from each of said remote stations respectively for connecting said remote stations to said attendant's station for transmitting voice and control signals thereto when said circuit means has been completed by actuation of the respective station switch control; means for supplying energizing potential from said potential source to said first pair of lines; respective disabling switches connected to said circuit means and movable into effective and ineffective positions for rendering inoperative and operative the respective remote stations; respective electrically-energizable devices for operating said disabling switches and connected to the respective ones of said first pairs of lines for operation by said potential source when said circuit means has been completed; and means associated with said electrically-energizable devices and operable upon completion of said circuit means in response to actuation of one of said on-off station switch controls, said means being operable to assure that said devices are conditioned to render inoperative all of said remote stations except the station corresponding to the on-off station switch control which is first actuated.

28. A remotely-operated dictation system which includes centrally-located recording and control equipment wherein a recording head is arranged for relative travelling movement with respect to a moving record, apparatus comprising, in combination, a plurality of remote dictator's instruments each including a microphone and an on-off switch device, circuit means for connecting any one of said instruments to said recording and control equipment, said circuit means being completed when the on-off switch device at said one instrument has been placed in "on" position, privacy switch means at each of said instruments and movable into effective and ineffective positions for rendering inoperative and operative the respective remote instruments, relay means connected to said circuit means for controlling said privacy switch means, a source of energizing potential at said recording and control equipment and connected to said circuit means for activating said relay means when the on-off switch device at one of said instruments has been placed in "on" position, and sequence control means for said relay means arranged to assure that the privacy switch means at said one instrument is conditioned in ineffective position while the privacy switch means at all other instruments are conditioned in effective position, whereby the dictator first to operate his on-off switch device has an exclusive channel through said circuit means to said recording and control equipment.

No references cited.